US006647359B1

(12) United States Patent
Verplank et al.

(10) Patent No.: US 6,647,359 B1
(45) Date of Patent: Nov. 11, 2003

(54) SYSTEM AND METHOD FOR SYNTHESIZING MUSIC BY SCANNING REAL OR SIMULATED VIBRATING OBJECT

(75) Inventors: William L. Verplank, Menlo Park, CA (US); Max V. Mathews, Stanford, CA (US); Robert S. Shaw, Santa Cruz, CA (US)

(73) Assignee: Interval Research Corporation, Palo Alto, CA (US)

( * ) Notice: Subject to any disclaimer, the term of this patent is extended or adjusted under 35 U.S.C. 154(b) by 0 days.

(21) Appl. No.: 09/356,246

(22) Filed: Jul. 16, 1999

(51) Int. Cl.[7] .............................................. G06F 17/10

(52) U.S. Cl. ............................ 703/2; 703/13; 381/119; 84/601; 84/477

(58) Field of Search ....................... 703/13, 2; 381/119; 84/601, 477

(56) References Cited

U.S. PATENT DOCUMENTS 4,833,963 A * 5/1989 Hayden et al. ............... 84/627
5,286,908 A * 2/1994 Jungleib ...................... 84/478
5,587,548 A * 12/1996 Smith, III .................... 84/622
5,808,221 A * 9/1998 Ashour et al. ................ 84/603
5,812,688 A * 9/1998 Gibson ....................... 345/978
5,900,568 A * 5/1999 Abrams ....................... 84/601
6,066,794 A 5/2000 Longo ......................... 84/626
6,111,577 A * 8/2000 Zilles et al. ................ 345/355
6,225,545 B1 * 5/2001 Suzuki et al. ............. 84/464 R
6,366,272 B1 * 4/2002 Rosenberg et al. ......... 345/156
6,369,834 B1 * 4/2002 Zilles et al. ................ 345/701
6,421,048 B1 * 7/2002 Shih et al. .................. 345/419

OTHER PUBLICATIONS

"Electronic Music: New Ways to Play" J. Paradiso, IEEE Spectrum, 0018–9235/97, Dec. 1997.*

"Getting A Feel for Dynamics: Using Haptic Interface Kits for Teaching Dynamics and Controls", C. Richard, ASME IMECE 6th Symposium on Haptics Interfaces, Nov. 1997.*

* cited by examiner

*Primary Examiner*—Kevin J. Teska
*Assistant Examiner*—Fred Ferris
(74) *Attorney, Agent, or Firm*—Van Pelt & Yi LLP

(57) ABSTRACT

In a music synthesis system, a scanning apparatus repeatedly scans a physical attribute of a vibrating object at a sequence of points of the vibrating object so as to repeatedly generate corresponding sequences of values. The music synthesis system generates an audio frequency waveform whose shape corresponds to the sequences of values. The vibrating object may be a physical object or a simulated object. The system may include a sensor for receiving user input, and means for mapping the user input into a stimulus signal that is applied to the vibrating object. In a preferred embodiment, the object vibrates and is manipulated by the user at haptic frequencies (0 to 15 hertz), while the sequences of scanned values are cyclically read at an audio frequencies so as to generate an audio frequency waveform whose timbre varies at the haptic frequencies associated with the object's vibration.

46 Claims, 9 Drawing Sheets

SYSTEM AND METHOD FOR SYNTHESIZING MUSIC BY SCANNING REAL OR SIMULATED VIBRATING OBJECT

The present invention relates generally to a system and method of synthesizing music, and particularly to a new music synthesis technique, herein called "scanned synthesis," that is intuitive and produces pleasing sounds with very little user training.

BACKGROUND OF THE INVENTION

There are a number of well established electronic music synthesis methodologies. For instance, wave tables are used in many music synthesis systems, with the frequency of each voice being determined by a rate at which values in the table are converted into output signals. Some music synthesis systems use frequency modulation techniques, others use digital filters to process input signals, and yet others use a variety of "physical models" that are simulated using various techniques.

In wave table based music synthesis, the shape of the audio waveform is governed by the waveform stored in a table. Typically the values stored in the wave table are fixed. For instance, the values in the table may be set equal to the sine or cosine of a function of the index for each entry in the table.

"Scanned synthesis," which is the name given by its inventors to the new music synthesis technique described in this document, is based not only on the psychoacoustics of how we hear and appreciate musical timbres, but also on our haptic abilities to shape and control timbres during live (real time) performance. Scanned synthesis places an emphasis on intuitive human control of timbre during real time performance, while most other synthesis techniques have given little attention to the control aspects of performance.

Psychoacoustics of Timbre

The sampling theorem guarantees that any sound the human ear can hear can be synthesized from a sufficient quantity of digital samples of the time function of the sound pressure. However, early results produced by digital synthesis in the 1960's shows that much needed to learned about how to generate digital samples corresponding to musically rich and pleasing timbres. At that time, human hearing was well enough understood. For instance, it was understood that the frequency spectrum was a better characterizer of timbre than the time function. We also knew that the important audio frequencies lie in the range of about 50 to 10,000 hertz. But efforts to digitally simulate traditional musical timbres using sound waves with fixed (unchanging with time) spectra were discouraging.

In the mid-1960's, Jean-Claude Risset demonstrated that good simulations of traditional instruments could be made with sounds in which the spectrum changed with time over the course of each note. In a brass timbre, the proportion of high frequency energy in the spectrum must increase as the intensity of the sound increases at the beginning (attack part) of the note. By contrast, for bells and most percussive instruments, high frequency overtones decay faster than low frequency overtones, so the proportion of high frequency energy is greatest at the beginning of the note. There is, however, an interesting exception to this rule. Nonlinearities in a Chinese gong, because it has a sharply bent edge, convert low frequency overtone energy into higher frequency energy, thus causing high frequencies first to build up and then eventually decay.

Haptic Frequencies

Many extensions to Risset's work have led to a better understanding of the properties of spectral time variations that the ear hears and the brain likes.

Spectral time variations can also be usefully characterized by their frequency spectrum. These frequencies are much lower, typically 0 to about 15 hertz, than audio frequencies (about 50 to 10,000 hertz). The upper limit is 15 because variations above 15 hertz often sound unpleasant.

At present, the terminology used to describe spectral time variations is not well established. Some kinds of spectral time variations, particularly vibrato and tremolo, are called modulations. But other kinds, such as occur in brass and bell sounds are unnamed. We, the inventors of the present invention, here propose the name "haptic frequencies" to characterize at least a class of these variations.

The inventors have observed that either by happy accident of nature or because of the way human beings are built, the frequency range of spectral changes the ear can understand is the same as the frequency range of body part (arms, fingers, etc.) movements that we can consciously control. Scanned synthesis provides methods for directly manipulating the spectrum of a sound by human movements.

The Q of Resonances in Traditional Instruments

Most traditional instruments use resonances of some sort to create sounds. The resonances may be of an air column, or a string, or a membrane or a plate. A successful instrument usually must have many resonances. In all cases, the resonant frequencies must lie somewhere in the audio frequency band in order to be heard. The ratio between the resonant frequencies and the haptic frequencies (rate of spectral changes) depends on the narrowness of the resonant peaks of the instrument, otherwise known as the Q of the resonances. For physical objects, Q depends mostly on energy losses in the material from which they are made. It is difficult to change the haptic frequencies of an instrument. It is also difficult to directly manipulate the spectrum by motions of the performer's body.

SUMMARY OF THE INVENTION

In a music synthesis system, using the scanned synthesis technique of the present invention, a scanning apparatus repeatedly scans a physical attribute of a vibrating object at a sequence of points on or in the vibrating object so as to repeatedly generate corresponding sequences of values. The music synthesis system generates an audio frequency waveform whose shape corresponds to the sequences of values. The vibrating object may be a physical object or a simulated object.

Examples of the physical attribute that is scanned include a position coordinate, a velocity, an acceleration, a third derivative of a position coordinate, a fourth derivative of a position coordinate, a linear combination of at least two of the position, velocity, acceleration, third derivative and fourth derivative, and a non-linear combination of at least two of the position, velocity, acceleration, third derivative and fourth derivative.

A user interface may be used to receive user input, and the vibrating object may be stimulated in accordance with the user input. For instance, a portion of the vibrating object may be displaced in response to the user input, or the initial shape or energy state of the object may be set in response to the user input. The user interface may include a sensor for receiving the user input, and means for mapping the user input into a stimulus signal that is applied to the vibrating physical object. Examples of the user interface sensor include a keyboard, a set of one or more foot pedals, a set of one or more position sensors, an audio microphone, a set of one or more pressure sensors, and any combination thereof.

In the music synthesis method of the present invention, the shape of a waveform is continuously updated based on either a physical attribute of a vibrating object (having a time varying shape or state), or a physical attribute of a simulated vibrating object. User inputs affect the evolving shape (or state) of the real or simulated vibrating physical object. User inputs can also affect other aspects of the music synthesis process, such as varying the rate at which the object is scanned, and varying the trajectory of points scanned. User inputs may also be used to select the attribute of the object that is being scanning.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Introduction

Scanned synthesis, at its simplest, uses a slowly vibrating object whose resonant frequencies are low enough that a performer can directly manipulate the object's vibrations by motions of his (or her) body, and a scanner to measure the shape of the object along a periodic path, governed by a periodic scanning function whose period is the fundamental frequency of the sound we wish to create. The scanning function translates the slowly changing "spatial wave" shape of the object into a sound wave with audio frequencies that the ear can hear.

Scanned synthesis, at least in its simplest implementations, can be looked upon as a descendent of wave table synthesis. In wave table synthesis, points in a function of one independent variable are computed and stored in successive memory locations, called a wave table. The wave table is scanned or read by a periodic scanning function to produce the samples of an audio sound wave. The period of the scanning function is the period of the synthesized sound. The scanning process is computationally simple and efficient. The computation of the wave table need only be done once.

In scanned synthesis, by way of contrast, the values stored in the "wave table" are constantly updated from measurements taken at a sequence of points on a physical or simulated object. The object, whether physical or simulated, undergoes change, on average, at a haptic frequency. Haptic frequencies are defined here to be between 0 and 50 hertz, with the preferred range being between 0 and 15 hertz.

For the purposes of this document, the term "vibrating object" is defined to mean any object whose shape dynamically changes over time, or which dynamically experiences a measurable change in internal conditions (e.g., pressure waves causing changes in pressure in a gas or liquid). Thus an object which "relaxes" from an initial shape to a rest state shape is said to be a vibrating object, although in this case the vibration is damped. In most circumstances, however, the shape (or other dynamically changing characteristic) of a vibrating object exhibits one or more repetitive or traveling waveforms.

Physical and Simulated Object Implementations

Figure 1A:
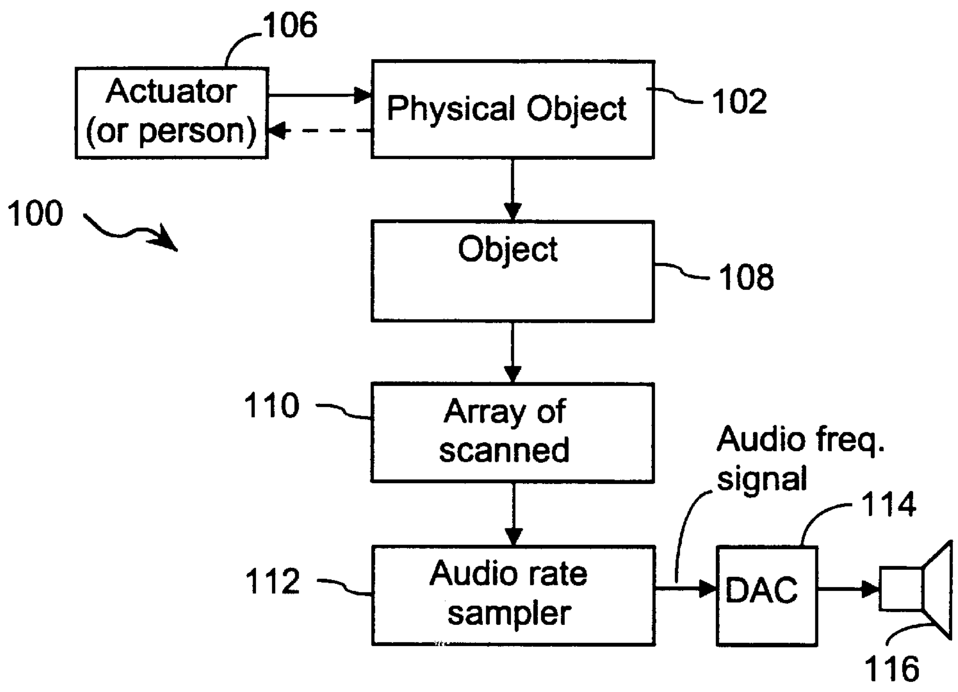
FIGS. 1A and 1B are block diagrams of music synthesis systems in accordance with two preferred embodiments of the present invention.
Figure 1B:
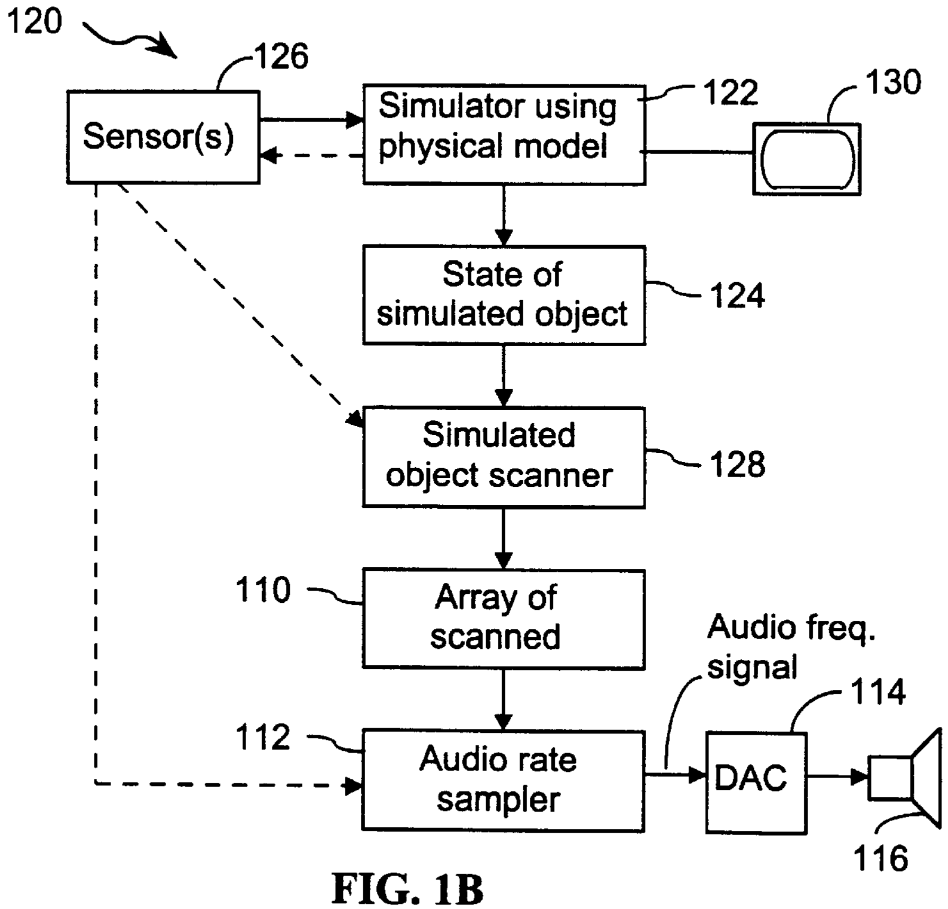

Referring to FIGS. 1A and 1B, there are shown two music synthesis systems 100 and 120 that utilize the principles of the present invention. In FIG. 1A, the system 100 includes a physical object 102, and an actuator 106 for manipulating or stimulating the object. Examples of suitable physical objects 102 are a vibrating string, a load coupled to a spring, a tank of water, a water filled bed or other container, a bouncing ball, a cloth or membrane that is set up to vibrate or undulate when shaken or hit, and a column filled with air or other gas. More generally, potentially suitable objects should change shape, or undergo measurable changes in internal conditions (e.g., pressure), at an underlying haptic frequency in response to manipulation or stimulation.

Examples of actuators include a person (e.g., a hand, finger or other body part interacting with the object 102), and virtually any type of tool that can be used to shake, hit or otherwise manipulate the object so as to induce shape changes at a haptic frequency.

A physical property of the object 102 is periodically scanned or measured, at a sequence of positions, by a scanner 108. Examples of the physical attribute that is scanned by the object scanner 108 include a position coordinate, a velocity, an acceleration, a third derivative of a position coordinate, a fourth derivative of a position coordinate, a linear combination of at least two of the position, velocity, acceleration, third derivative and fourth derivative, and a non-linear combination of at least two of the position, velocity, acceleration, third derivative and fourth derivative.

The type of scanner 108 used will depend on the object 102 used and the particular physical property being measured. Examples of scanners 108 include optical and ultrasonic position measurement tools, which are suitable for measuring not only position, but also various derivatives of position and combinations thereof. The scanners mentioned here are only examples; their mention is not intended to limit the scope of the invention.

The scanner 108 generates an array of scanned values 110, which are similar to the values stored in a wave table, as discussed above. In a preferred embodiment, the scanner 108 scans the object 102, and thus regenerates the array of scanned values 110, at a predefined object scan repetition rate, such as one, five, ten or fifty cycles per second. The object scan rate is independent of the audio frequency of the music being generated, and may also be independent of the haptic frequency of the object 102. The object scan rate determines how often the shape of waveform being generated is adjusted. Typical object scan rates are between 10 and 50 cycles per second, although in some circumstances object scan rates might range from as low as 0.5 per second to as high as perhaps 100 or so cycles per second. The object value sampling rate is N times the object scan repetition rate, where the object's specified physical attribute is measured at N positions.

The array 110 of scanned values is periodically read by an audio rate sampler 112 to generate a digital audio signal that is converted into an analog audio signal using a digital to analog converter 114 and then played over a speaker 116, or recorded for later use. The array 110 of scanned values is read or sampled in much the same was as a wave table, except that the array 110 is being continuously updated with measurements read from the vibrating object. The array 110 is typically read, cyclically, at a rate of 50 to 2,500 cycles per second, although higher rates may be useful in some circumstances. The cyclic reading rate typically corresponds to the fundamental frequency of the musical tones being generated.

It is important to note that the number of data points read from the array 110 may be more or less than the number of measurement values stored in the array 110. Thus, the audio rate sampler 112 may use interpolation to "read data from object positions" that are between the discrete object positions at which measurements have been taken. Also, as just mentioned, the audio rate sampler 112 may read fewer points than the N measurement points of the object.

When the DAC (digital to analog converter) sample rate (SR) is set to a fixed value, such as 44,000 samples per second, or any other appropriate value, then the number of values cyclically read from the array 110 by the audio rate sampler 112 will be equal to the SR/CR where CR is the cycle rate of the audio rate sampler. For instance, if the cycle rate is 440 hertz, corresponding to a fundamental frequency of middle C, then one hundred (100) values will be read from the array 110 for each cycle, regardless of the number of distinct object values are actually stored in the array 110.

Figure 2:
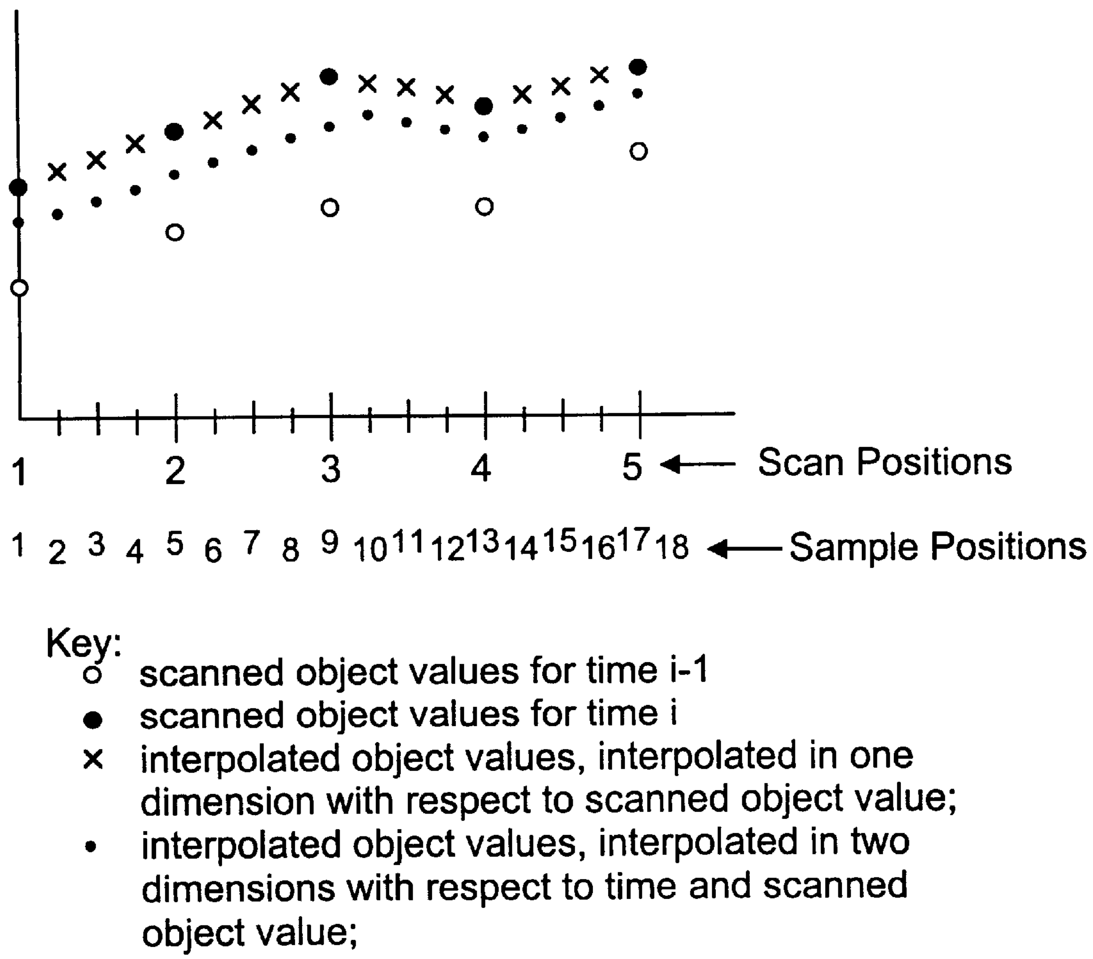
FIG. 2 is a graph depicting sample values generated using two dimensional interpolation.

Referring to FIG. 2, in some implementations the audio sampler 112 performs two 16 types of interpolation. First, the audio sampler 112 may interpolate between neighboring data points. In FIG. 2 the large solid dots represent stored data points and the "X" symbols represent interpolated data points.

In addition, the audio sample may perform time domain interpolation. Time domain interpolation is used to smooth the transitions between successive scans of the object. For instance, the object may be scanned 10 times per second, while the audio sampler might read the array of scanned values at a much higher number of cycle rate, such as 440 cycles per second. To avoid artifacts such as clicking noise, two modifications are made to the system. First, the array 110 stores two sets of object values: the previous scanned values and the current scanned values. Second, the audio rate sampler 112 interpolates between the first and second scanned values so as to smoothly transition between the two sets of object values. When the audio rate sampler 112 accesses data for an object position that is not stored in the array 110, it performs interpolation in two dimensions: the time dimension and the object value dimension. In FIG. 2 the circles represent stored data points from the previous scan and the small solid dots represent data points interpolated with respect to time and, when necessary, with respect to neighboring object values.

The "shape" of the waveform represented by the array 110 of values determines the frequency characteristics, and thus the timbre of the musical voice generated by the music synthesizer. This shape evolves over time due to the changing state of the object, which is captured by the object scanner 108 and stored as values in the array 110.

In some implementations, the object scanner 108 and the audio rate sampler 112 of FIG. 1A are merged into a single module that outputs an audio frequency signal.

Referring to FIG. 1B, there is shown another music synthesis system 120, this one using a simulated object 122 in place of a physical object. Simulated objects, are in general easier to work with and easier to use in music simulation systems. Further, there is an extensive body of learning and well developed simulation software for simulating the dynamics of many types of objects, both real and imaginary.

The simulated physical object 122 may be a one, two or three dimensional object or surface, or other complex structure. For instance, the object may be a string, a drum surface, or the surface of a body of water (either constrained or unconstrained by a set of retaining walls).

The operation of system 120 is the same as the operation of system 100, except as described below.

In this system, one or more sensors 126 are used to stimulate the object. For instance, the sensor 106 may add a fixed amount of energy to the object at a specific position, each time it is pushed. In some implementations the sensor 126 pushes back on the user so as to give the user physical feedback about the state of the object. The "actuators" are called "sensors" 126 in this system because they typically sense the position, or amount of force, of a tool or of a person's finger or the like. Examples of suitable sensors 126 include piezoelectric pressure sensors (which can be used to measure force, position, or both), audio microphones, pointer devices such as a computer mouse, three-dimensional positioning devices such as a radio baton, a foot pedal (such as those found on many musical instruments), as well as various devices such as wheels and sliders that are coupled to potentiometers or other position sensing devices. The sensors mentioned here are only examples; their mention is not intended to limit the scope of the invention.

Figure 3A:
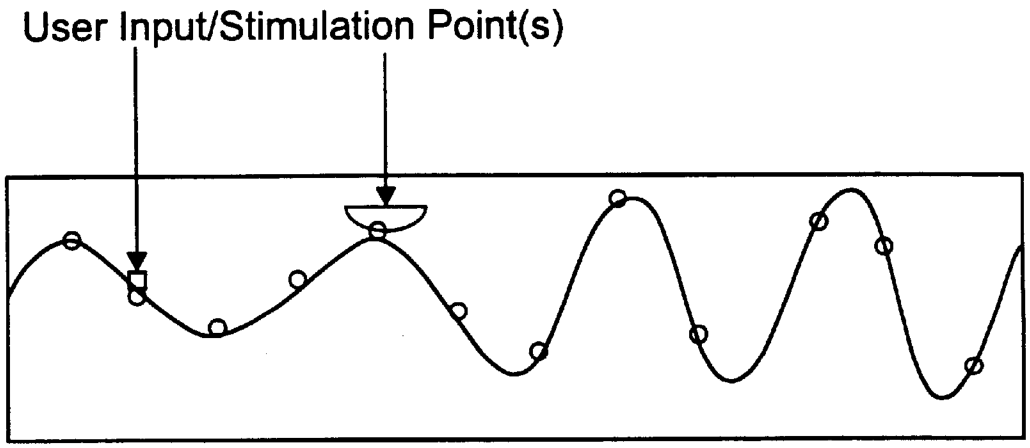
FIG. 3A depicts scan points on a vibrating string, where the string may be a computer simulated string.

Referring to FIG. 3A, the stimulus generated from the sensors 126 may be applied at a fixed or variable position of the object. Furthermore, the stimulus may be applied to the object over a range of points, for instance to simulate the effect of a blow by a rounded hammer head.

The system 120 also includes an object scanner 128, for scanning a specified physical attribute of the simulated object at a sequence of points of the simulated vibrating object. For instance, if the object is a vibrating string which extends from position x=0 to x=L, the scanner 128 might measure the displacement (y) of the string from its resting position (y=0) at a sequence of points along the string, as shown in FIG. 3A. If the scanner 128 measures the physical attribute at N points, it generates an array of scanned values 110 having N values. The N values in array 110 may either be raw measured values, or values obtained by applying a predefined mapping function to the measured values.

As in system 100, FIG. 1A, the object scan rate (sometimes called the object update rate) is independent of the audio frequency of the music being generated, and may also be independent of the haptic frequency of the simulated object 122. Further, the audio sampling rate is independent of the physical model. In fact, in general the audio rate sampler 112 operates independently of all other aspects of the system, treating the array 110 of values generated by the object scanner as a wave table, without regard to the source of the values in the array 110. In addition, the audio rate sampler 112 generally operates at a higher cyclic frequency than both the haptic frequency associated with the simulated object and the cyclic scan rate associated with the object scanner 108 or 128.

In some, but not all, implementations, the object scan, which measures or copies a specified physical attribute of the model at a sequence of positions, is performed independent of the simulator that is continuously updating the state of the physical model. In other implementations, the simulated object scanner is combined or merged with the object simulator.

In some implementations, the positions of the object points whose physical property is measured or copied by the object scanner 128 varies in accordance with one or more of the sensor inputs. For example, if the points at which the object is scanned are positioned along a circle, the radius of that circle may vary in accordance with a sensor input signal. Changing the portion of the object that is scanned may affect the range of timbres generated.

In addition, in some implementations the update rate of the object scanner is controlled by one or more sensor inputs. While the underlying haptic rate of timbre changes is controlled by the object simulator, the scanner's update rate affects the smoothness of transitions between timbres.

In some implementations, the sampling rate of the audio rate sampler 112 is controlled by one of the sensors 106. For instance, using a musical keyboard as an audio rate control sensor, the repetition rate at which the scanned values are read could be set at the fundamental frequency of the associated note (e.g., when the user strikes middle C on the musical keyboard, the audio rate sampler would read the scanned values at a rate of 440 cycles per second).

Figure 3B:
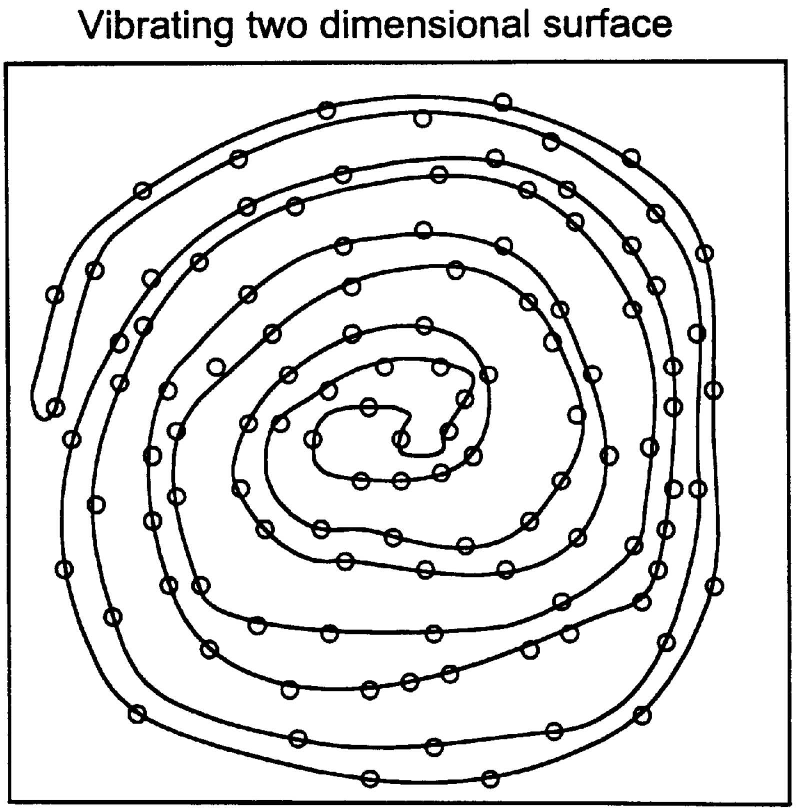
FIG. 3B depicts a two dimensional sequence of scan points on a vibrating surface.

As shown in FIG. 3B, the sequence of object positions at which measurements are taken may be complex, such as positions along a spiral path on the vibrating surface of a membrane, or any other predefined pattern.

The system 120 of FIG. 1B, will often include a display device 130 for showing the evolving shape of the simulated vibrating object. The visual feedback provided by such a device may be essential for enabling a user to develop an intuitive feel for the relationship between the user's actions on the sensor(s) 126 and the musical timbres generated by the system.

The two dimensional data interpolation described above with respect to FIG. 2 is also applicable to the system of FIG. 1B. Using time dimension interpolation can reduce the computer resources required to implement the system 120, because the object simulator 122 can update the state of the simulated object less frequently than might otherwise be the case. When the update rate of the simulator 122 is reduced, the rate of scans performed by the simulated object scanner 128 is similarly reduced. Time dimension interpolation by the audio rate scanner 112 provides smooth transitions between the scanned values from the relatively infrequent object scans.

In some implementations of the system shown in FIG. 1B, the object simulator 122 and the simulated object scanner 128 are merged into a single module that periodically generates a set of scanned object values. In other implementations, the simulated object scanner 128 and the audio rate sampler 112 are merged into a single module that outputs an audio frequency signal.

Figure 4:
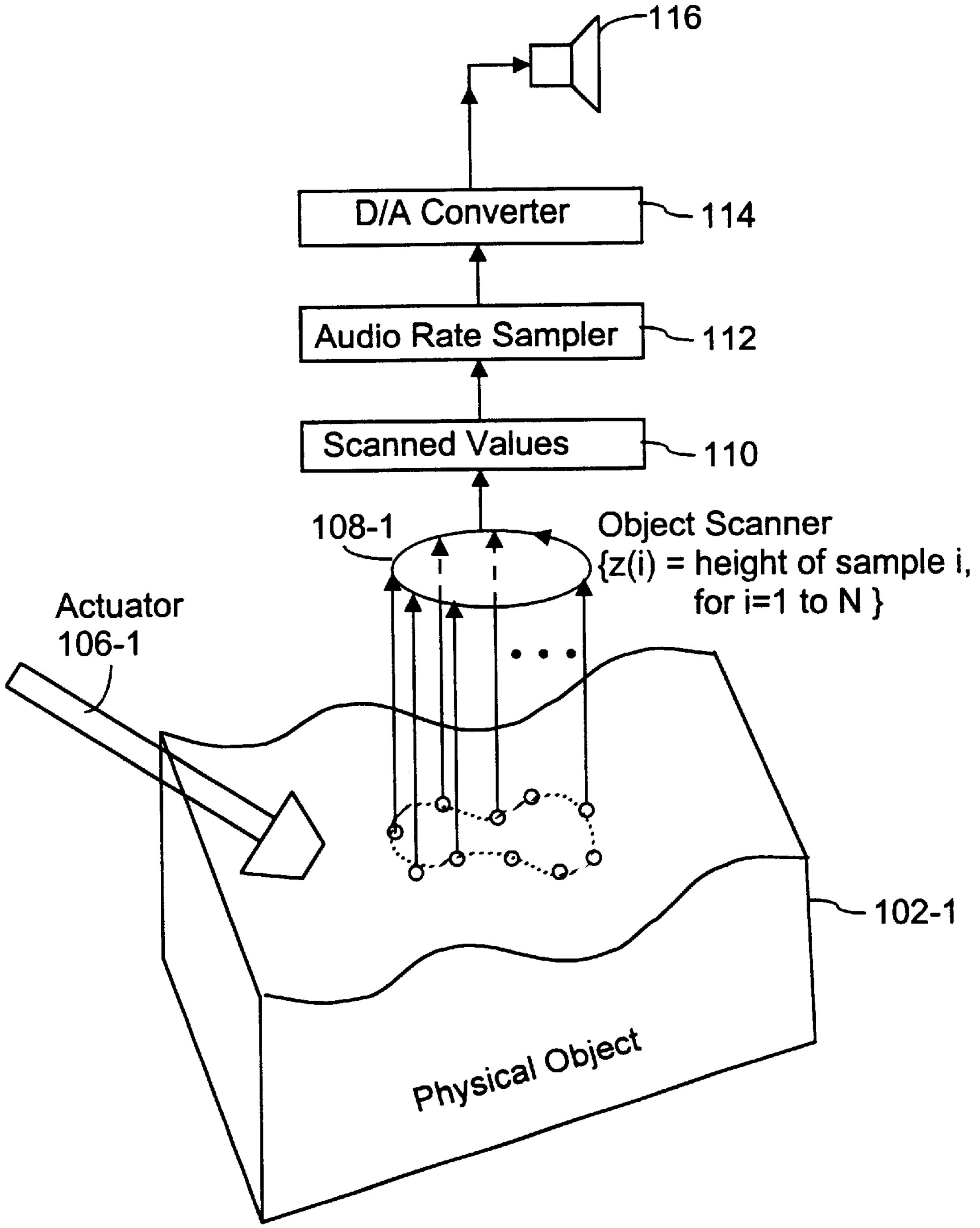
FIG. 4 depicts a music synthesis system in accordance with FIG. 1A.

FIG. 4 shows an example of an implementation of the invention using a physical object 102-1 consisting of a liquid held in a tank. The actuator 106-1 is used to make waves, and the object scanner 108-1 measures the height of the liquid z(i) at a sequence of positions (i=1 to N), such as positions determined by projecting an oval onto the surface of the liquid. The other components of the system are as described above.

Before stimulation of the liquid, the surface of the liquid will be flat and constant. As a result, the scanned values will be constant and no sound will be heard. If the actuator is used to slowly and gently press on the surface of the liquid, sound will be generated as the shape of the liquid surface slowly changes and the sound will then taper off as the liquid returns to a flat surface state. More vigorous and continued stimulation of the liquid will cause louder and higher frequency sounds to be generated, with the spatial frequencies of the liquid surface being translated into acoustic frequencies. The rate of change of the shape of the liquid surface governs the rate of change of the frequency components of the sound being generated.

In a more complex implementation, the sampling rate of the audio rate sampler 112 may be controlled by another sensor, such as a musical keyboard.

Finite Element Model

Figure 5A:
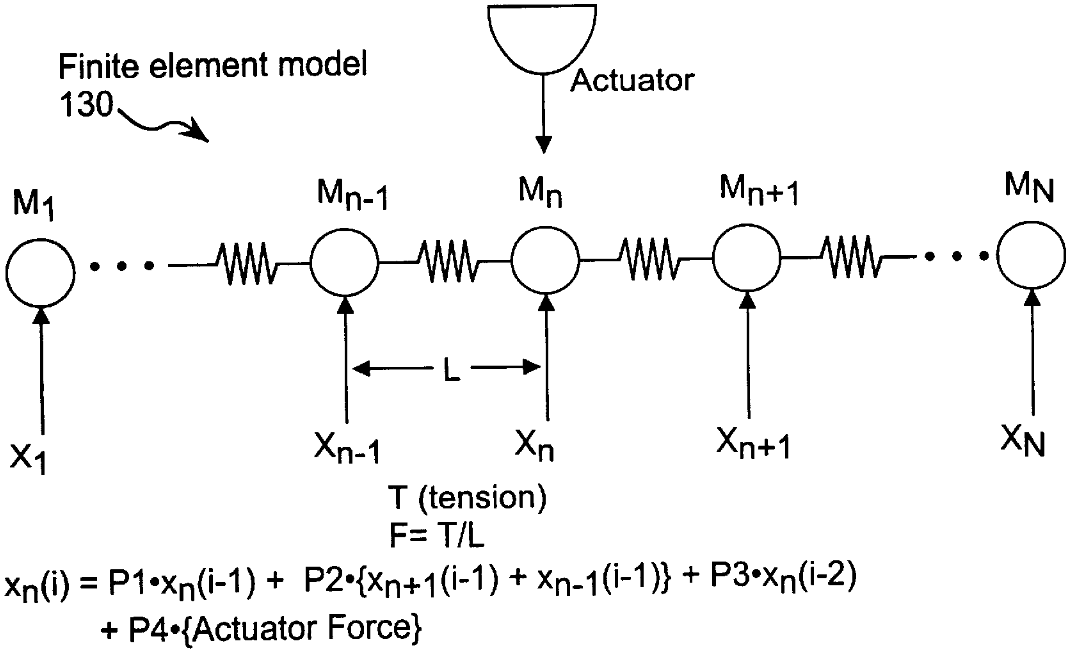
FIGS. 5A and 5B depicts finite element models of a vibrating object.

Referring to FIG. 5A, a vibrating physical object is typically modeled in a simulator as a finite element model. FIG. 5A represents a model for a vibrating string, in which the horizontal position of each mass ($M_1$ to $M_N$) is fixed, but the vertical position of each mass changes over time in accordance with (A) the positions of its neighbors and (B) any stimulus applied to the simulated string. A set of difference equations are used to update the state of each element of the model over time, as well as to determine the interactions between neighboring elements. An example of such a difference equation is:

$$x_n(i)=P1\cdot x_n(i-1)+P2\cdot\{x_{n+1}(i-1)+x_{n-}(i-1)\}+P3\cdot x_n(i-2)+P4\cdot\{\text{Actuator Force}\}$$

where i is a time index, n identifies the mass whose vertical position is being computed, and P1, P2, P3 and P4 are model parameters. For example, in a simple string model, suitable model parameters would be P1=2—2F/M where F is the force applied to the mass by the springs, and M is the mass of the element, P2=F/M, P3=1 and P4=0.5.

Figure 5B:
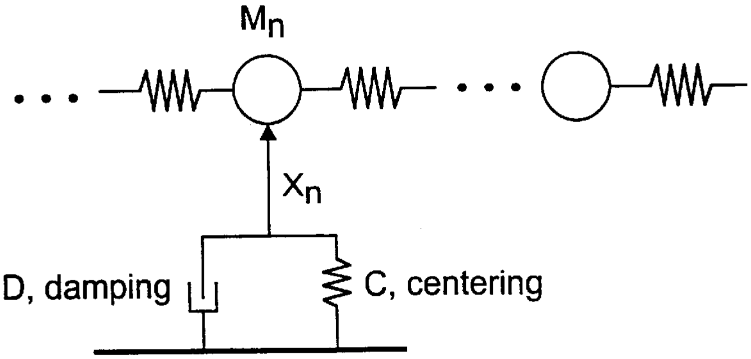

FIG. 5B shows another finite element model in which one or more elements of the model are constrained by a centering spring C and an oscillation damper D. These additional components change the coefficients of the difference equation for updating the state of the elements having the additional components, and thus will affect the timbre or frequence characteristics of the sound that is generated. However, this change in the model of the object does not affect any other aspects of the music simulation system. In fact, the object model used by the simulator 122 (FIG. 1B) can often be changed without affecting the operation of the rest of the system. In some cases, such as when the underlying data structures used by the object simulator are changed, the object scanner 128 (FIG. 1B) must be changed to track the changes made to the model used by the object simulator.

Computer Implementation

Figure 6:
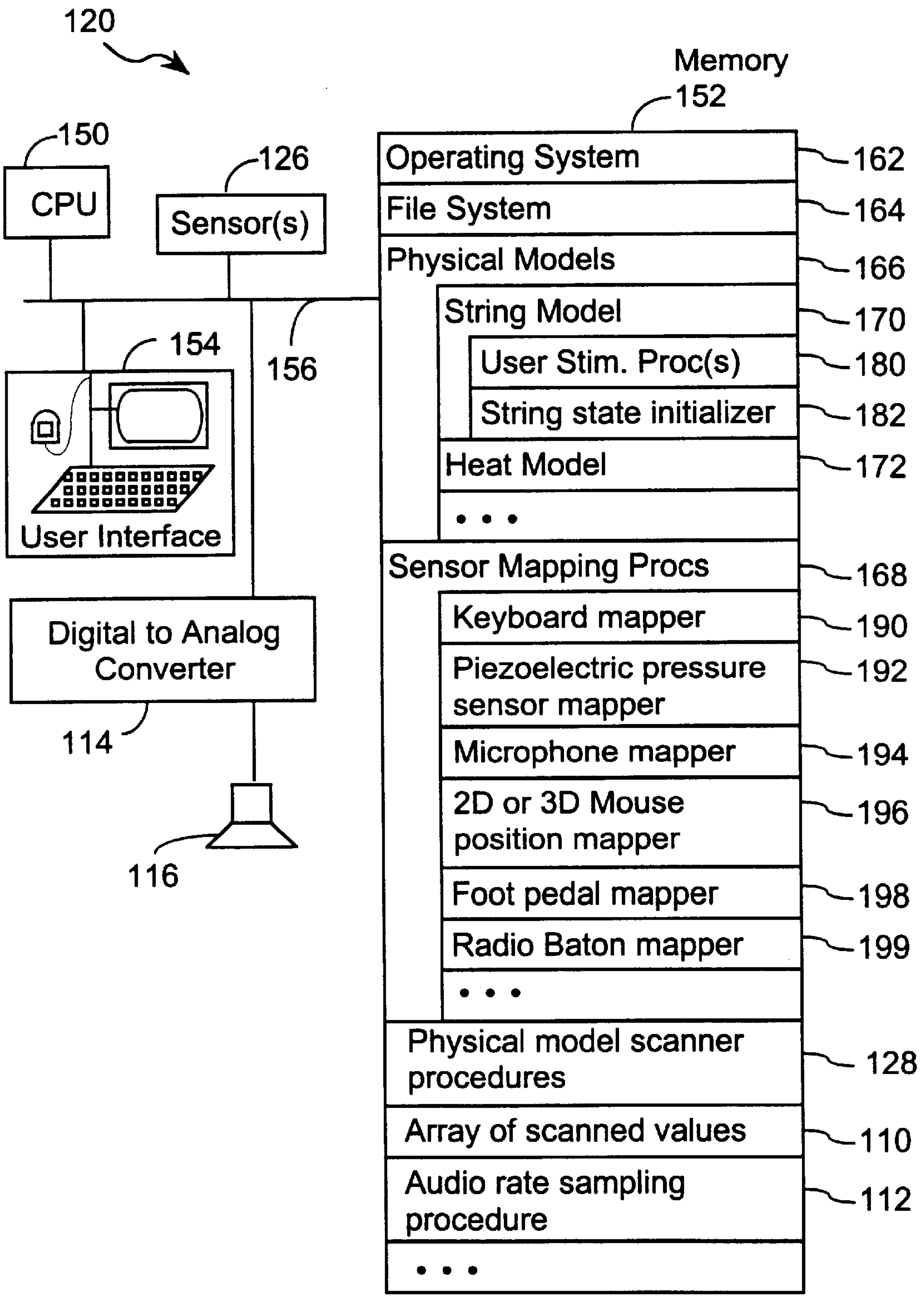
FIG. 6 is a block diagram of a computer system embodiment of the present invention.

Referring to FIG. 6, there is shown a computer system implementation of the music synthesis system 120. The computer system preferably includes:

- one or more central processing units (CPU's) 150;
- memory 152, typically including both random access memory and slower non-volatile memory, such as magnetic disk storage;
- a user interface 154, which may include a display device, keyboard (computer or musical), and other devices;
- one or more sensors 126, for stimulating the physical objects being simulated; the sensors 126 may either be part of the conventional computer user interface 154 or may be implemented using supplemental devices;
- a digital to analog converter 114, for converting a stream of digital samples into an analog audio frequency signal;
- one or more audio speakers 116; and
- one or more communication busses 156 for interconnecting the aforementioned devices.

In some embodiments, the audio speakers 116 may be replaced with a device for recording audio signals, such as a tape recorder. Some implementations will not include a user interface 154 and will instead have just the sensor(s) 126.

The computer's memory 152 may store:

- an operating system 162 for performing basic system functions;
- a file system 164;
- one or more physical models 166 for simulating the operation or motion of an object or set of objects;
- sensor mapping procedures 168 for mapping sensor signals into model stimulus signals;
- physical model scanning procedures 128 (sometimes called the object scanner) for scanning the simulated object so as to generate the array 110 of scanned values; and
- an audio rate sampling procedure 112.

The physical models 166 may include a finite element string wave model 170 (using difference equations, as discussed above), a finite element heat model 172, and other models. Each model, in addition to containing an appropriate finite element or other type of model for simulating movement or other operation of an object, may also include one or more user stimulus procedures 180, for controlling how user stimulus signals affect the state of the object being simulated.

A model may also include a state initialization procedure 182 for initializing the state of the object being simulated in response to a user stimulus signal. For instance, a vibrating string or surface may be initialized to a particular shape, as well a set of initial velocities and accelerations, based on user inputs. To be even more specific, if the sensor 126 is a musical keyboard, the string may be initialized to a shape corresponding to which key is pressed by the user, and then re-initialized each time the user presses the same or another key. The initial shape of the string will determine the initial waveform, which is an important factor affecting the timbre generated. In another example, an array of acceleration values may be added to the string model (i.e., added to the previous acceleration values at the model elements) for each key pressed by the user.

The sensor mapping procedures 168 may include a keyboard mapping procedure 190, a piezoelectric pressure sensor mapper 192 (for use when the sensor 126 is a piezoelectric pressure sensor), a microphone mapper 194 (of use when the sensor 126 is a microphone), a two or three dimensional mouse position mapper 196 (for mapping movements of the mouse into object stimulus signals), a foot pedal mapper 198, a radio baton mapper 199, and so on.

The computer system 120 can be implemented using virtually any modem computer system, and thus the specific type and model of the computer is not relevant to the present discussion. Thus, the computer system can be implemented using common desktop computers, and can also be implemented as any of a wide variety of customized music synthesizers. For instance, a scanned synthesis computer system can be implemented inside the housing of an electronic keyboard, using the keys of the keyboard as the system's sensors 126.

Sound Synthesis Using Multiple Object Scanning

Figure 7:
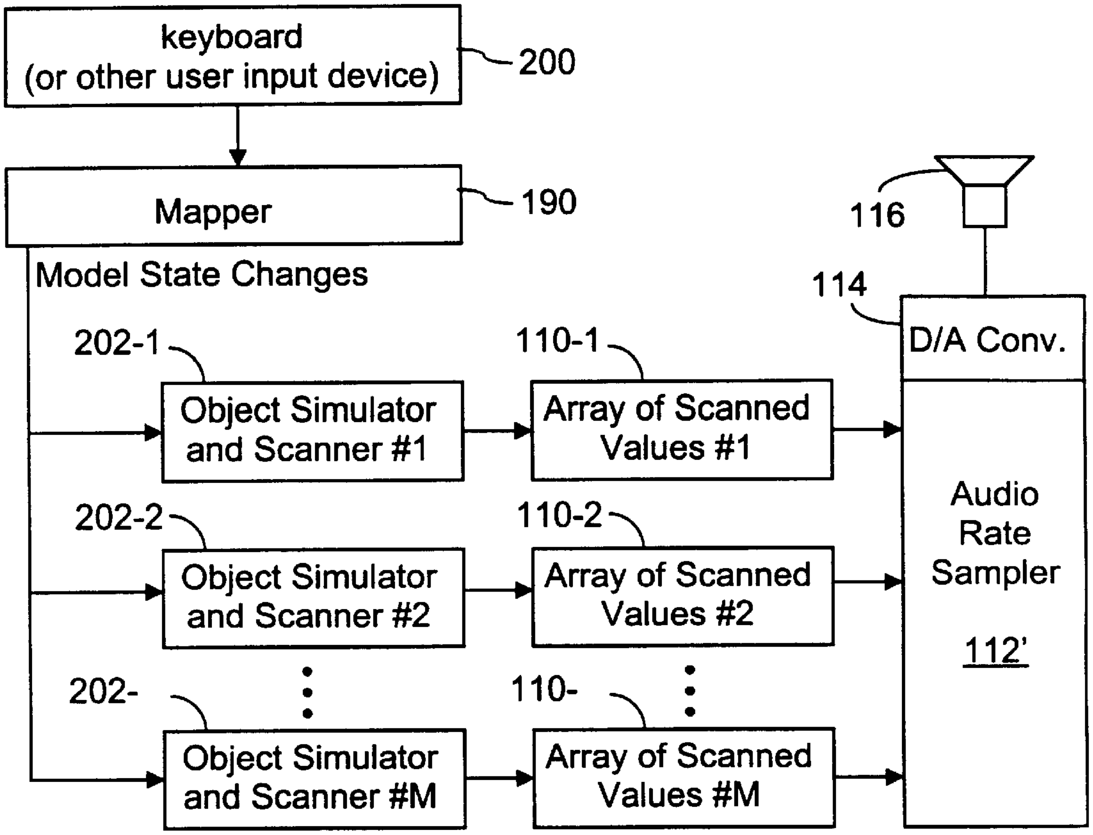
FIG. 7 is a block diagram of a system for synthesizing M voices in parallel.

Referring to FIG. 7, there is shown a music synthesizer system having M voices that are synthesized in parallel. A musical keyboard 200 or other input device is used as a sensor for generating stimulus signals that are mapped by a mapper procedure 190 into model state change values. In one embodiment, the M objects 202 are vibrating strings or drum surfaces, and the keys pressed on the keyboard are mapped into a set of initial shapes for the M objects. Further, different ranges of keys affect different subsets of the objects. After an object has been initialized, it vibrates with decreasing energy over time, until the user stimulates the object again by pressing an appropriate key.

In a second embodiment, the keys pressed on the keyboard are mapped into stimulation signals, such as arrays of velocity or acceleration values for the respective elements of the M objects, which are then combined with or used to replace the previous velocity or acceleration values of the respective elements. More generally, user inputs may be mapped into virtually any type of stimulation signals, which are then combined with or used to replace corresponding model parameters of the simulated object.

The M objects and their corresponding object scanners generate M arrays 110 of scanned values, which are then cyclically read by the audio rate sampler 112' so as to generate the M voices. The M voice signals are combined and converted into an analog signal by a digital to analog converter 114, which is then delivered to one or more audio speakers 116. In other implementations, more than one analog signal may be generated for use with separate audio speakers, and more generally the elements shown in FIG. 7 can be reconfigured and combined in many different ways so as to generate a wide variety of timbres and combinations of timbres.

Alternate Embodiments

Figure 8:
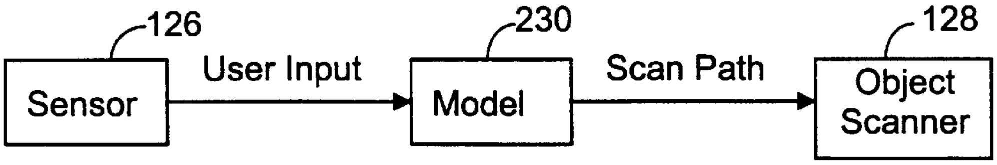
FIG. 8 depicts mapping of user input into a scan path, which determines the points of the object to be scanned.

Referring to FIG. 8, in an alternate embodiment the scan path of the vibrating object is dynamically determined by using a model 230 to convert an input signal (received from a sensor or other device) into a sequence of values that are then used to determine the scan path of the object scanner. For instance, the model can be a simulation model of a physical system, such as a model of a ball rolling on or through a specified environment.

Figure 9:
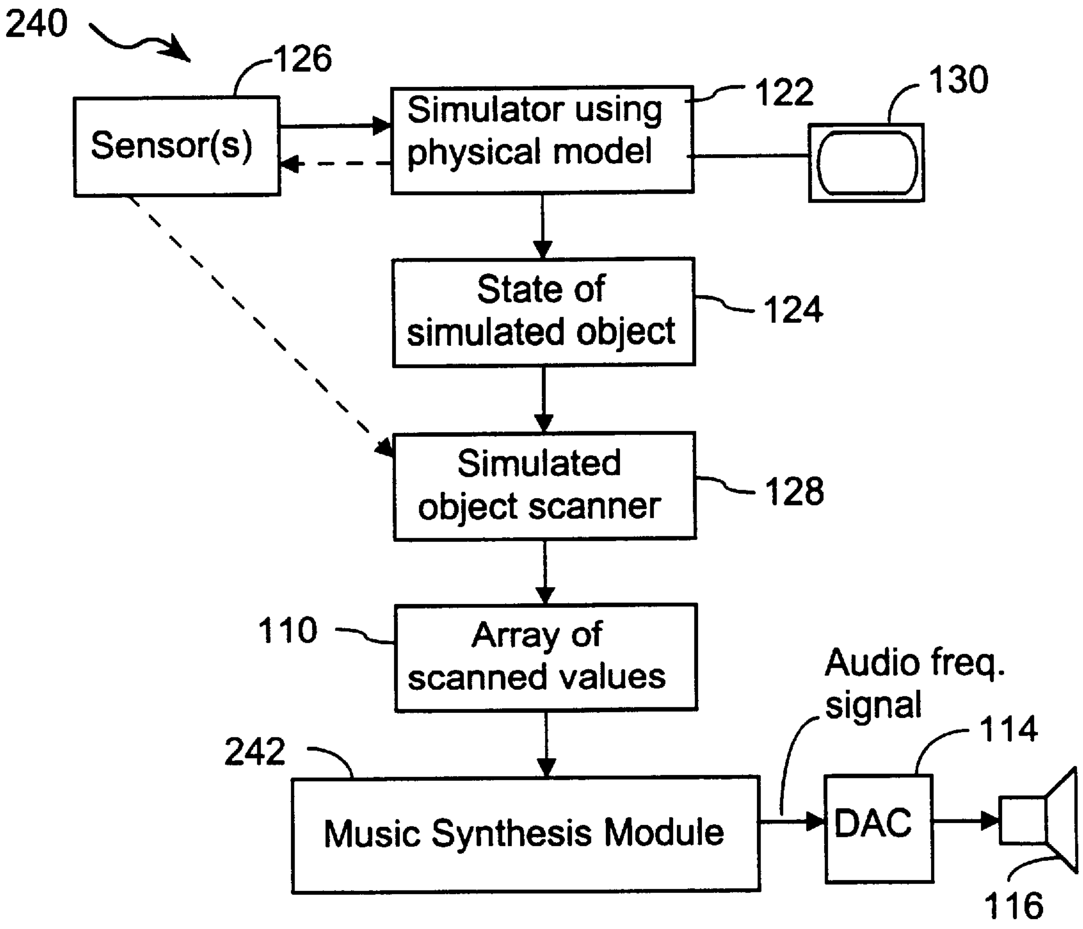
FIG. 9 depicts a music synthesis system in which an array of scanned values generated using scanned synthesis is used as a control input signal or a wave table in another music synthesis module.

FIG. 9, in another alternate embodiment 240 of the invention, the sequence of values stored in the array 110 is used as (A) a control signal for a music synthesis module 242, or (B) as a dynamically changing wave table for the music synthesis module 242. For instance, in a music synthesis module using FM modulation synthesis techniques, which may be implemented using two or more wave tables, the array 110 can be used as one of the wave tables. Since the values stored in the array 110 will tend to change at haptic rates, the use of this array 110 as a control signal or as a wave table in a music synthesis module will cause haptic frequency changes in the musical sounds generated by the music synthesis module.

Figure 10:
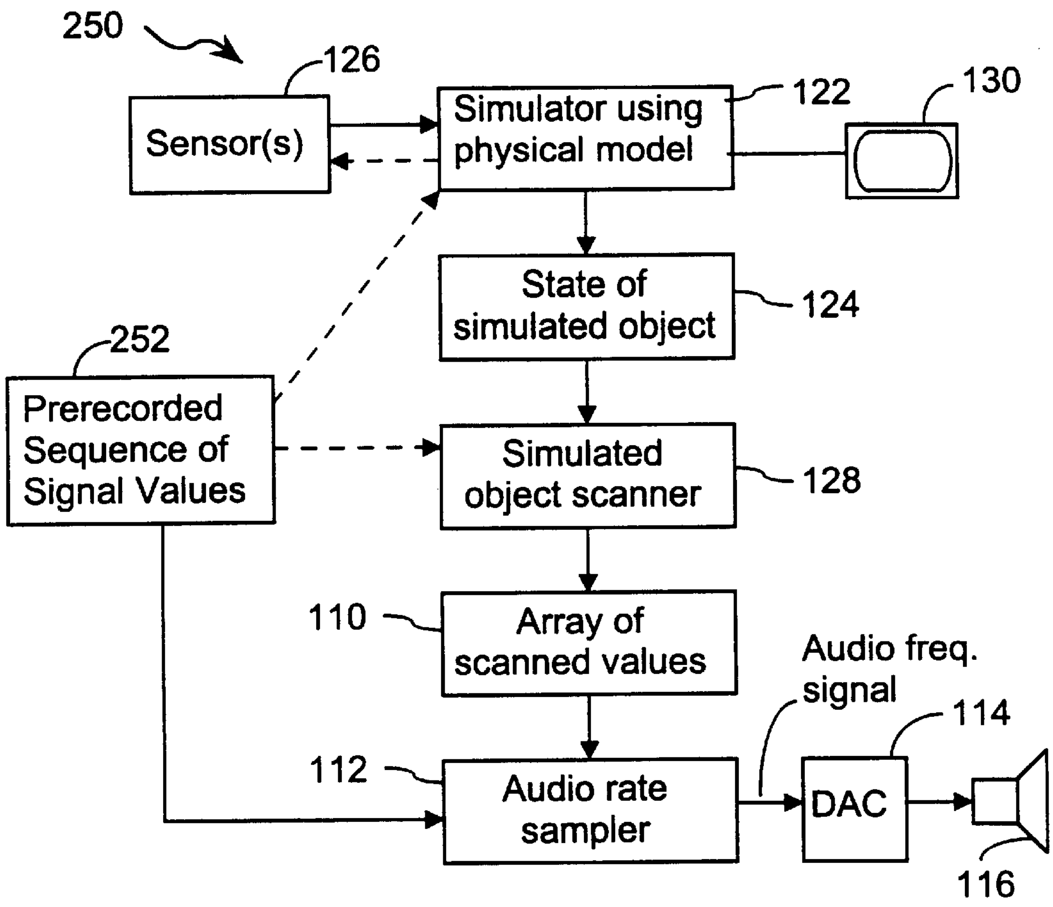
FIG. 10 depicts an embodiment of the music synthesis system in which a prerecorded sequence of signals are used as input signals to the system.

Referring to FIG. 10, in yet another embodiment 250 of the invention, in place of the sensors 126, or in addition to the sensors, a prerecorded sequence of signals 252 is used as input signals to the system 250 for one or more of the following purposes:

- as input to the object simulator 122 for stimulating the object;
- to set the cyclic frequency of the audio rate sampler 112 (in which case the recorded signals are similar to a recorded sequence of notes played on a keyboard); and/or
- to set any other parameter of the system 250, such as a parameter of the physical model simulated by the simulator 122, or the scan rate of the object scanner 128.

Thus, "user input" to the music synthesis system includes not only signals generated by sensors, and direct user input (in the case of physical objects), but also prerecorded sequences of input signals. When the prerecorded sequence of signals is a sequence of notes that are used to control the cyclic frequency of the audio rate sampler 112, then the music synthesis system 250 will play back the music composition represented by the sequence of notes, and the user's inputs will affect the timbre or quality of the notes of the composition. In this embodiment the user's influence on the music generated is limited to a role that does not interfere with the sequence notes and timing of the composition, but which still has an immediately noticeable affect on the resulting music. This is but one example of an implementation of the present invention in which users having little or no musical training can nevertheless successfully participate in an aurally pleasing musical performance.

As indicated above, any input signal, including a prerecorded sequence of input signals, can be used for more than one purpose by the system, and thus can be used to both stimulate the simulated object and to control the cyclic frequency of the audio rate sampler 112.

The present invention can be implemented as a computer program product that includes a computer program mechanism embedded in a computer readable storage medium. For instance, the computer program product could contain the program modules shown in FIG. 6. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of synthesizing musical sounds, comprising:

simulating a vibrating object in accordance with a predefined physical model;

repeatedly scanning, at a rate independent of any parameter associated with the simulating step, a specified physical attribute of the simulated vibrating object at a sequence of points of the simulated vibrating object so as to repeatedly generate corresponding sequences of values; and independently of the simulating step, generating an audio frequency waveform whose shape corresponds to the sequences of values.

2. The method of claim 1, wherein the specified physical attribute is selected from the group consisting of: a position coordinate, a velocity, an acceleration, a third derivative of a position coordinate, a fourth derivative of a position coordinate, a linear combination of at least two of the position, velocity, acceleration, third derivative and fourth derivative, and a non-linear combination of at least two of the position, velocity, acceleration, third derivative and fourth derivative.

3. The method of claim 1, further including:

stimulating the simulated vibrating object in accordance with user input.

4. The method of claim 3, wherein the stimulating step includes displacing a portion of the simulated vibrating object in accordance with the user input.

5. The method of claim 3, wherein the user input is generated by a sensor selected from the group consisting of: a keyboard, a set of one or more foot pedals, a set of one or more position sensors, an audio microphone, a set of one or more pressure sensors, and any combination thereof.

6. The method of claim 5, wherein the stimulating step includes mapping one or more physical measurement signals received from the sensor into a model stimulus signal and applying the model stimulus signal to the simulated vibrating object.

7. The method of claim 1, wherein the physical model is a finite element model.

8. The method of claim 1, wherein the finite element model is selected from the group consisting of: a finite element wave model, a finite element heat model, and a difference equation finite element model.

9. The method of claim 1, further including:

varying the sequence of points in accordance with user input.

10. The method of claim 1, further including:

varying a rate at which the scanning step is performed in accordance with user input.

11. The method of claim 1, wherein the sequence of points at which the simulated vibrating object is scanned independent of any parameter associated with the simulating step.

12. The method of claim 1, wherein the simulating step includes varying the physical attribute of the simulated physical object at a rate of less than 15 hertz; and the generating step includes processing the sequences of values at an audio frequency rate in the range of 50 to 2,500 cycles per second.

13. The method of claim 12, wherein the generating step includes periodically storing an array of values corresponding to a latest sequence of the sequences of values;

repeatedly outputting values corresponding to the stored array of values at a repetition rate of 50 to 2,500 cycles per second.

14. The method of claim 1, further including:

varying a rate at which the generating step is performed in accordance with user input.

15. A method of synthesizing musical sounds, comprising:

repeatedly sensing a specified physical attribute of a vibrating physical object at a sequence of points of the vibrating physical object so as to repeatedly generate corresponding sequences of values, the specified physical attribute is selected from the group consisting of a position coordinate, a velocity, an acceleration, a third derivative of a position coordinate, a fourth derivative of a position coordinate, a linear combination of at least two of the position, velocity, acceleration, third derivative and fourth derivative, and a non-linear combination of at least two of the position, velocity, acceleration, third derivative and fourth derivative; and generating an audio frequency waveform whose shape corresponds to the sequences of values.

16. The method of claim 15, further including:

stimulating the vibrating object in accordance with user input applied to the vibrating physical object.

17. The method of claim 16, wherein the stimulating step includes displacing a portion of the vibrating physical object.

18. The method of claim 16, wherein the user input is received by a sensor, and then mapped into a stimulus signal that is applied to the vibrating physical object; and the sensor is selected from the group consisting of: a keyboard, a set of one or more foot pedals, a set of one or more position sensors, an audio microphone, a set of one or more pressure sensors, and any combination thereof.

19. The method of claim 15, further including:

varying the sequence of points in accordance with user input.

20. The method of claim 15, further including:

varying a rate at which the scanning step is performed in accordance with user input.

21. The method of claim 15, further including:

the generating step includes processing the sequences of values at an audio frequency rate in the range of 50 to 2,500 cycles per second.

22. The method of claim 21, wherein the generating step includes periodically storing an array of values corresponding to a latest sequence of the sequences of values;

repeatedly outputting values corresponding to the stored array of values at a repetition rate of 50 to 2,500 cycles per second.

23. The method of claim 15, further including:

varying a rate at which the generating step is performed in accordance with user input.

24. A computer program product for use in conjunction with a computer system, the computer program product comprising a computer readable storage medium and a computer program mechanism embedded therein, the computer program mechanism comprising:

a simulation module for simulating a vibrating object in accordance with a predefined physical model;

scanning instructions for repeatedly scanning, at a rate independent of any parameter associated with the physical model, a specified physical attribute of the simulated vibrating object at a sequence of points of the simulated vibrating object so as to repeatedly generate corresponding sequences of values; and music waveform generation instructions for generating an audio frequency waveform whose shape corresponds to the sequences of values.

25. The computer program product of claim 24, wherein the specified physical attribute is selected from the group consisting of: a position coordinate, a velocity, an acceleration, a third derivative of a position coordinate, a fourth derivative of a position coordinate, a linear combination of at least two of the position, velocity, acceleration, third derivative and fourth derivative, and a non-linear combination of at least two of the position, velocity, acceleration, third derivative and fourth derivative.

26. The computer program product of claim 24, further including:

the simulation module including instructions for stimulating the simulated vibrating object in accordance with user input.

27. The computer program product of claim 26, wherein the simulation module instructions include instructions for displacing a portion of the simulated vibrating object in accordance with the user input.

28. The computer program product of claim 26, wherein the user input is generated using a sensor selected from the group consisting of: a keyboard, a set of one or more foot pedals, a set of one or more position sensors, an audio microphone, a set of one or more pressure sensors, and any combination thereof.

29. The computer program product of claim 28, wherein the simulation module instructions include instructions for mapping one or more physical measurement signals received from the sensor into a model stimulus signal and applying the model stimulus signal to the simulated vibrating object.

30. The computer program product of claim 24, wherein the physical model is a finite element model.

31. The computer program product of claim 24, wherein the finite element model is selected from the group consisting of: a finite element wave model, a finite element heat model, and a difference equation finite element model.

32. The computer program product of claim 24, wherein the scanning instructions include instructions for varying the sequence of points in accordance with user input.

33. The computer program product of claim 24, further including:

the scanning instructions include instructions for varying a rate at which the scanning is performed in accordance with user input.

34. The computer program product of claim 24, wherein the sequence of points at which the simulated vibrating object is scanned independent of any parameter associated with the physical model.

35. The computer program product of claim 24, wherein the simulation module includes instructions for varying the physical attribute of the simulated physical object at a rate of less than 15 hertz; and the music waveform generation instructions includes instructions for processing the sequences of values at an audio frequency rate in the range of 50 to 2,500 cycles per second.

36. The computer program product of claim 35, wherein the music waveform generation instructions include instructions for:

periodically storing an array of values corresponding to a latest sequence of the sequences of values; and repeatedly outputting values corresponding to the stored array of values at a repetition rate of 50 to 2,500 cycles per second.

37. The computer program product of claim 24, further including:

music waveform generation instructions including instructions for varying a rate at which the audio frequency waveform is generated in accordance with user input.

38. A music synthesis system, comprising:

a data processor;

an audio speaker;

signal conversion apparatus for converting a digital signal into an analog signal, the signal conversion apparatus having an input coupled to the data processor and an output coupled to the audio speaker; and a memory coupled to the data processor, the memory storing procedures for execution by the data processor, the stored procedures including:

a simulation module for simulating a vibrating object in accordance with a predefined physical model wherein the physical model is a finite element model;

scanning instructions for repeatedly scanning a specified physical attribute of the simulated vibrating object at a sequence of points of the simulated vibrating object so as to repeatedly generate corresponding sequences of values; and music waveform generation instructions for generating the digital signal, the digital signal comprising an audio frequency waveform whose shape corresponds to the sequences of values, wherein the music waveform generation instructions are executed by the data processor independently of execution of the simulation module.

39. The music synthesis system of claim 38, wherein the specified physical attribute is selected from the group consisting of: a position coordinate, a velocity, an acceleration, a third derivative of a position coordinate, a fourth derivative of a position coordinate, a linear combination of at least two of the position, velocity, acceleration, third derivative and fourth derivative, and a non-linear combination of at least two of the position, velocity, acceleration, third derivative and fourth derivative.

40. The music synthesis system of claim 38, including:

a user interface for receiving user input and stimulating the simulated vibrating object in accordance with the user input.

41. The music synthesis system of claim 40, wherein the user interface includes a sensor for receiving the user input, and means for mapping the user input into a stimulus signal that is applied to the simulated vibrating physical object; and the sensor is selected from the group consisting of: a keyboard, a set of one or more foot pedals, a set of one or more position sensors, an audio microphone, a set of one or more pressure sensors, and any combination thereof.

42. The music synthesis system of claim 38, wherein the finite element model is selected from the group consisting of: a finite element wave model, a finite element heat model, and a difference equation finite element model.

43. The music synthesis system of claim 38, wherein the scanning instructions include instructions for varying the sequence of points in accordance with a user input received by a sensor.

44. The music synthesis system of claim 38, further including:

the scanning instructions include instructions for varying a rate at which the scanning is performed in accordance with a user input received by a sensor.

45. The music synthesis system of claim 38, wherein the scanning is performed at a rate independent of any parameter associated with the physical model.

46. The music synthesis system of claim 38, wherein the music waveform generation instructions include instructions for:

periodically storing an array of values corresponding to a latest sequence of the sequences of values; and repeatedly outputting values corresponding to the stored array of values at a repetition rate of 50 to 2,500 cycles per second.

* * * * *